US012808744B2

(12) United States Patent
Hayasaka et al.

(10) Patent No.: US 12,808,744 B2
(45) Date of Patent: Nov. 24, 2026

(54) ROTATING ELECTRICAL MACHINE DAMAGE DIAGNOSTIC SYSTEM AND DAMAGE DIAGNOSTIC METHOD

(71) Applicant: Hitachi Industrial Products, Ltd., Tokyo (JP)

(72) Inventors: Yasushi Hayasaka, Tokyo (JP); Masaaki Endo, Tokyo (JP); Atsushi Fukunaga, Tokyo (JP)

(73) Assignee: HITACHI INDUSTRIAL PRODUCTS, LTD., Tokyo (JP)

( * ) Notice: Subject to any disclaimer, the term of this patent is extended or adjusted under 35 U.S.C. 154(b) by 304 days.

(21) Appl. No.: 18/013,300

(22) PCT Filed: Apr. 26, 2021

(86) PCT No.: PCT/JP2021/016629
§ 371 (c)(1),
(2) Date: Dec. 28, 2022

(87) PCT Pub. No.: WO2022/004110
PCT Pub. Date: Jan. 6, 2022

(65) Prior Publication Data

US 2023/0204451 A1 Jun. 29, 2023

(30) Foreign Application Priority Data

Jul. 3, 2020 (JP) ................................ 2020-115390

(51) Int. Cl.
*G01M 5/00* (2006.01)

(52) U.S. Cl.
CPC ........ *G01M 5/0041* (2013.01); *G01M 5/0033* (2013.01)

(58) Field of Classification Search
CPC .......................... G01M 5/0041; G01M 5/0033
See application file for complete search history.

(56) References Cited

U.S. PATENT DOCUMENTS 7,219,044 B1 5/2007 Prevey et al.
2004/0236450 A1* 11/2004 Bryant .............. G05B 23/0297 700/108

(Continued)

FOREIGN PATENT DOCUMENTS

JP 64-021226 U 2/1989
JP 10-160646 A 6/1998

(Continued)

OTHER PUBLICATIONS

Machine translation of JP2012112787A (Year: 2012).*

(Continued)

*Primary Examiner* — Lee E Rodak
*Assistant Examiner* — Sangkyung Lee
(74) *Attorney, Agent, or Firm* — MATTINGLY & MALUR, PC

(57) ABSTRACT

Accurate damage diagnosis is obtained using strain, typified by low-cycle fatigue damage and the like, representing a majority of the damage from age deterioration of a machine facility. A rotating electrical machine damage diagnostic system evaluates fatigue damage in a component of a rotating electrical machine based on a sensor. A strain range calculating section determines elastic strain and elastic stress in an evaluation area of the rotating electrical machine in terms of a quadratic function of a rotational speed of the rotating electrical machine detected by the sensor. Conversion of the elastic strain range and the elastic stress range into a total strain range is performed and a fatigue damage rate is calculated in the evaluation area of the rotating electrical machine from the total strain range resulting from the conversion. An integration section is provided for cumulating the fatigue damage rates to calculate a cumulated fatigue damage rate.

5 Claims, 11 Drawing Sheets

(56) References Cited

U.S. PATENT DOCUMENTS

| | | | | |
|---|---|---|---|---|
| 2006/0142893 | A1 * | 6/2006 | Yasugi | G05B 19/4065 702/182 |
| 2007/0172357 | A1 | 7/2007 | Saito et al. | |
| 2011/0091321 | A1 * | 4/2011 | Baker | F03D 7/047 416/61 |
| 2017/0163116 | A1 * | 6/2017 | Imura | H02K 3/527 |
| 2018/0299341 | A1 * | 10/2018 | Nöth | G01P 15/097 |

FOREIGN PATENT DOCUMENTS

| | | | | | |
|---|---|---|---|---|---|
| JP | 2001066228 | A | * | 3/2001 | |
| JP | 2007-178397 | A | | 7/2007 | |
| JP | 4105852 | B2 | | 6/2008 | |
| JP | 2010011688 | A | * | 1/2010 | B60L 50/61 |
| JP | 2010025747 | A | * | 2/2010 | |
| JP | 2012-112787 | B2 | | 6/2012 | |
| JP | 2012112787 | A | * | 6/2012 | |
| JP | 2015042867 | A | * | 3/2015 | F03D 17/00 |
| JP | 6381723 | B1 | * | 8/2018 | |
| JP | 2019-502222 | A | | 1/2019 | |
| WO | WO-2014050284 | A1 | * | 4/2014 | B23K 35/302 |
| WO | WO-2016169301 | A1 | * | 10/2016 | F01D 21/003 |
| WO | 2017/117607 | A1 | | 7/2017 | |

OTHER PUBLICATIONS

Machine translation of WO2016169301A1 (Year: 2016).*
Machine translation of JP2010025747A (Year: 2010).*
Machine translation of JP200166228A (Year: 2001).*
Machine translation of WO2014050284A1 (Year: 2014).*
Mahcine translaton of JP6381723B1 (Year: 2018).*
Mahcine translaton of JP2015042867A (Year: 2015).*
Mahcine translaton of JP2010011688A (Year: 2010).*
N. Miyamoto, Information on fatigue assessment of plant equipment (Part 4-background).
International Search Report of PCT/JP2021/016629 dated Jul. 6, 2021.

* cited by examiner

| ELASTIC STRAIN RANGE $\Delta\varepsilon_{ei}$ | NUMBER OF TIMES |
|---|---|
| $1*\Delta\varepsilon_p/m=\Delta\varepsilon_{ei\,1}$ | $n_{i1}$ |
| $2*\Delta\varepsilon_p/m=\Delta\varepsilon_{ei\,2}$ | $n_{i2}$ |
| . | . |
| . | . |
| . | . |
| $(m-1)*\Delta\varepsilon_p/m=\Delta_{\varepsilon\,ei\,m-1}$ | $n_{im-1}$ |
| $m*\Delta\varepsilon_p/m=\Delta\varepsilon_{ei\,m}$ | $n_{im}$ |

| TOTAL STRAIN RANGE | NUMBER OF TIMES |
|---|---|
| $\Delta \varepsilon_{i1}$ | $n_{i1}$ |
| $\Delta \varepsilon_{i2}$ | $n_{i2}$ |
| . | . |
| . | . |
| . | . |
| $\Delta \varepsilon_{im-1}$ | $n_{im-1}$ |
| $\Delta \varepsilon_{im}$ | $n_{im}$ |

ROTATING ELECTRICAL MACHINE DAMAGE DIAGNOSTIC SYSTEM AND DAMAGE DIAGNOSTIC METHOD

TECHNICAL FIELD OF THE INVENTION

The present invention relates to a damage diagnostic system and a damage diagnostic method for a rotating electrical machine such as a generator, a motor, and the like and, more particularly, to a damage diagnostic system and method for a rotating electrical machine which are capable of performing damage diagnosis using strain, typified by low-cycle fatigue damage and the like, as a damage state of various pieces of equipment constituting a rotating electrical machine.

BACKGROUND ART

In most cases, for damage diagnosis of various pieces of equipment constituting an electrical generating facility, the operation of various pieces of equipment is stopped at every lapse of a predetermined period of time or every time the number of times of operation reaches a fixed number. Then, as regular checks, components of the various pieces of equipment are checked to determine whether the damage states of the components of the various pieces of equipment reach a defined reference state. Then, if there is a component determined as needing replacing, the component is repaired or replaced as required.

Instead of stopping the operation of various pieces of equipment constituting the electrical generating facility at every lapse of a predetermined period of time or every time the number of times of operation reaches a fixed number, a sensor is installed in each of the various pieces of equipment to monitor the operation of each piece of equipment as constant monitoring. A sensor signal output from each sensor is constantly monitored. Only if the sensor signal falls outside a certain reference range, the operation of the various pieces of equipment is stopped to check for the damage state of the components of the various pieces of equipment.

On the other hand, with recent wide-spread use of communication networks typified by computers (computing machines) and Internet, diagnostic systems have been developed, in which, for diagnosing damage in the various pieces of equipment constituting the electrical generating facility, monitoring signals indicative of operation states of the various pieces of equipment are transmitted to a monitoring facility in a remote location via a communication network, and, based on the monitoring signals received in the monitoring facility, deterioration conditions of the various pieces of equipment constituting the electrical generating facility are diagnosed. As an example of such diagnostic systems, the diagnostic system disclosed in Document 1 is known.

In the diagnostic system disclosed in Document 1, monitoring signals obtained from the various piece of the equipment constituting the electrical generating facility are transmitted to the monitoring facility in a remote location using the communication network. This enables constant monitoring of the deterioration conditions of the various pieces of equipment based on the monitoring signals received in the monitoring facility. Document 1 discloses the invention of the apparatus performing damage diagnosis using signals with two different sampling frequencies for data acquisition, for the purpose of appropriately reducing the load on the communication network and appropriately improving the diagnostic accuracy for equipment damage.

As further diagnostic details in the diagnostic system, the various pieces of equipment may be evaluated for fatigue life. In connection with this, the fatigue lifetime evaluation apparatus in Document 2 includes: an analyzer for deriving elastic stress of a member based on information about a member shape and constituent materials; a first arithmetic section for deriving stress and strain under load conditions in the constituent materials based on the elastic stress; a second arithmetic section for deriving stress and strain under unloaded conditions with reference to the stress and strain under load conditions; a calculator for deriving plastic strain based on the stress and strain under load conditions and the stress and strain under unloaded conditions; a decision section for deriving based on the plastic strain whether a fatigue type of the member is high cycle fatigue caused only by elastic deformation or low cycle fatigue involving plastic deformation; and an evaluator for deriving a lifetime of the equipment 1 based on the fatigue type. The apparatus may use Neuber's rule for the first arithmetic section and the second arithmetic section.

DOCUMENT LIST

Patent Document

Document 1: JP 4105852 B
Document 2: JP 2012-112787 A

SUMMARY OF INVENTION

Technical Problem

In conventional art in Document 1, however, the evaluation accuracy was sometimes inadequate in the damage diagnosis using strain, typified by low-cycle fatigue damage and the like, representing a majority of the damage from age deterioration of the machine facility.

In the apparatus disclosed in Document 2, the analysis accuracy of the elastic stress is low because when the elastic stress is analyzed, conditions of machine operation are not obtained from sensors. Therefore, the prediction accuracy of strain to be subsequently analyzed is low. As a result, the apparatus has a problem with accuracy of fatigue lifetime prediction.

The present invention has been made in view of such technological background. An object of the present invention is to improve accuracy of damage diagnosis using strain, typified by low-cycle fatigue damage and the like, representing a majority of the damage from age deterioration of a machine facility.

Solution to Problem

Accordingly, an aspect of the present invention provides "a rotating electrical machine damage diagnostic system which evaluates fatigue damage in a component of a rotating electrical machine based on a sensor signal representing detection by a sensor installed in the rotating electrical machine, comprising: a strain range calculating section for determining elastic strain and elastic stress in an evaluation area of the rotating electrical machine in terms of a quadratic function of a rotational speed of the rotating electrical machine detected by the sensor, counting frequency of occurrence of an elastic strain range and an elastic stress range in the evaluation area, and performing conversion of the elastic strain range and the elastic stress range into a total strain range; a fatigue damage rate calculating section for calculating fatigue damage rates in the evaluation area of the rotating electrical machine from the total strain range resulting from the conversion; and an integration section for cumulating the fatigue damage rates to calculate a cumulated fatigue damage rate.

Another aspect of the present invention provides "a rotating electrical machine damage diagnostic method for evaluating fatigue damage in a component of a rotating electrical machine based on a sensor signal representing detection by a sensor installed in the rotating electrical machine, comprising the steps of: determining elastic strain and elastic stress in an evaluation area of the rotating electrical machine in terms of a quadratic function of a rotational speed of the rotating electrical machine detected by the sensor; counting frequency of occurrence of an elastic strain range and an elastic stress range in the evaluation area; performing conversion of the elastic strain range and the elastic stress range into a total strain range; calculating fatigue damage rates in the evaluation area of the rotating electrical machine from the total strain range resulting from the conversion; and cumulating the fatigue damage rates to calculate a cumulated fatigue damage rate.

Advantageous Effects of Invention

According to the present invention, it is possible to evaluate fatigue damage using strain, typified by low-cycle fatigue representing a significant proportion of the damage from age deterioration of the machine facility, more particularly, to predict damage coming from the rotation of a rotating electrical machine component with precision. Therefore, remaining lifetime may be evaluated with precision, thus increasing the reliability of the rotating electrical machine and achieving suitable maintenance.

DESCRIPTION OF EMBODIMENTS

Embodiments of the present invention will be described with reference to the drawings.

Embodiment 1

Embodiment 1 according to the present invention will be described with reference to FIG. 1 to FIG. 15. A rotating electrical machine used in a wind power generation apparatus is described for an example in this embodiment although a damage diagnostic system according to the present invention is applicable to various types of rotating electrical machines.

Figure 1:
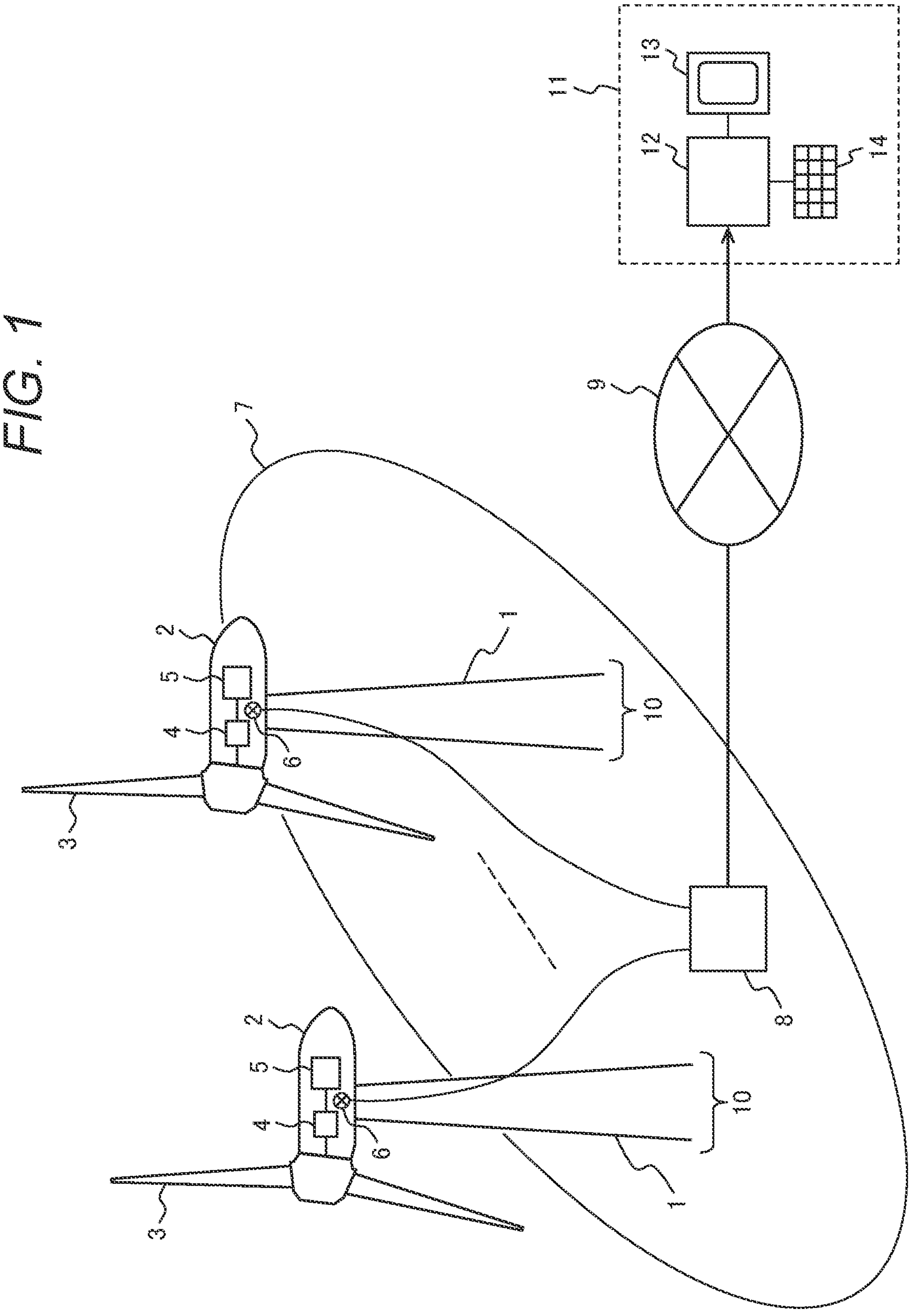
FIG. 1 is a diagram illustrating an example configuration of a damage diagnostic system applied to a wind power generation apparatus.

FIG. 1 illustrates an example configuration of a damage diagnostic system applied to a wind power generation apparatus. In FIG. 1, the wind power generation apparatus has blades 3 rotatably supported by a nacelle 2 on top of a tower 1. The rotation of the blades 3 is transferred through a speedup gear 4 to a generator 5 as the rotating electrical machine in the nacelle 2 for generation of electric power. A plurality of wind power generation apparatuses 10 may form a windfarm 7. In the damage diagnostic system, a rotation counter 6 is installed in a rotating portion in the nacelle 2 of the wind power generation apparatus 10 to detect a rotational speed. Typically, the rotational speed and rotational speeds of the other wind power generation apparatuses 10 in the windfarm 7 are collected in an intra-farm control monitoring unit 8 and are then transmitted as signals from the control monitoring unit 8 to a remotely located diagnostic apparatus 11 through communication such as Internet 9 or the like. The diagnostic apparatus 11 comprises a processing unit 12 including a calculator, an input unit 14 such as a keyboard, and an output unit 13 such as a monitor screen. It is noted that the diagnostic apparatus 11 may be located next to the control monitoring unit 8 in the windfarm 7.

Figure 2:
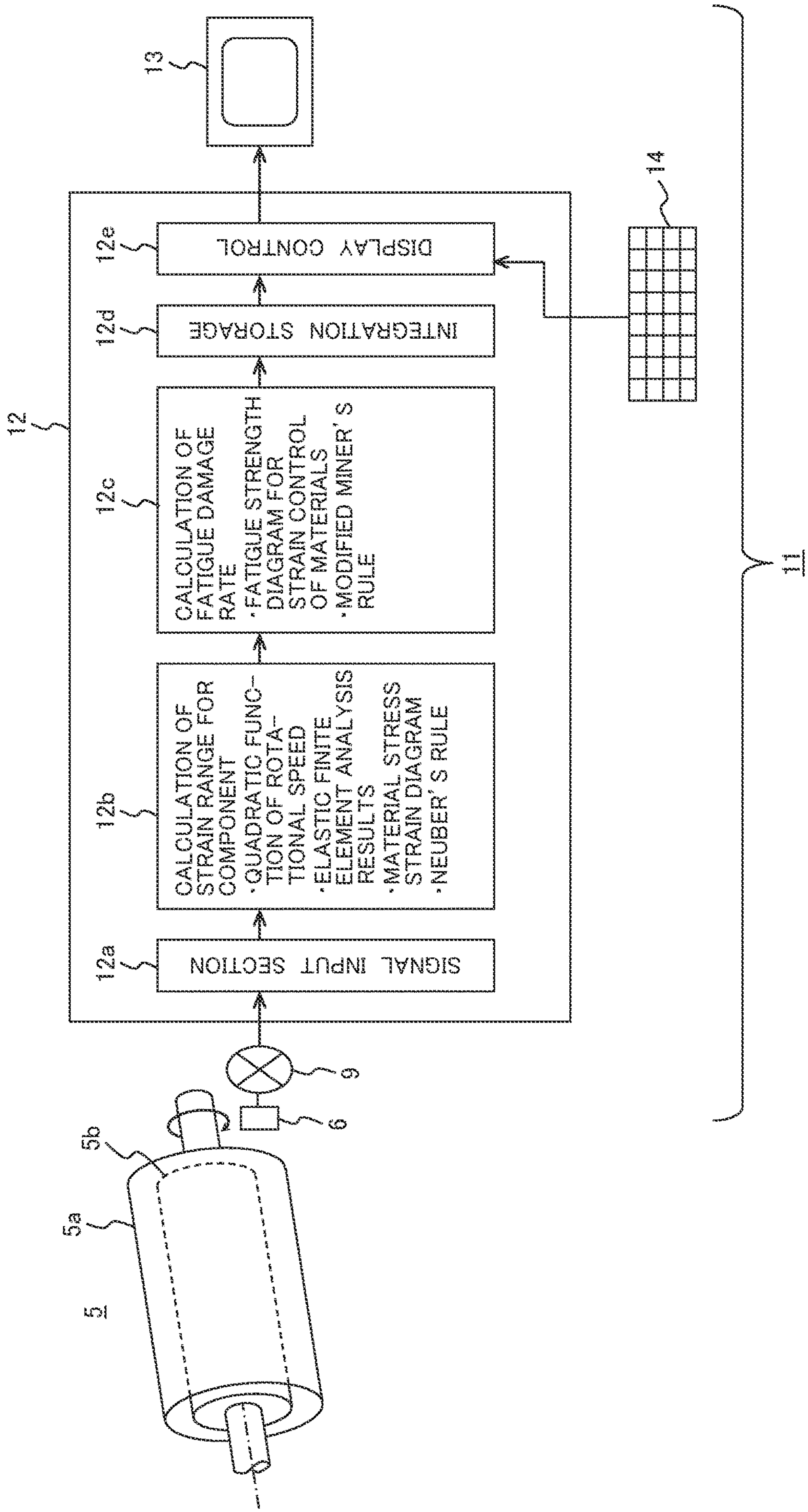
FIG. 2 is a block diagram illustrating the processing functionality of a diagnostic apparatus 11.

FIG. 2 is a block diagram illustrating the processing functionality of the diagnostic apparatus 11. The processing functionality includes a rotational speed input section 12*a*, a component strain range calculating section 12*b*, a fatigue damage rate calculating section 12*c*, an integration storage section 12*d*, and a display control section 12*e*.

In the present invention, the rotation counter 6 is installed in the rotating electrical machine 5 (generator) including a rotating component 5*b* and a non-rotating component 5*a*, and the diagnostic apparatus 11 detects a rotational speed and/or the like with the rotation counter 6, and incorporates the rotational speed and/or the like into the signal input section 12*a* of the remotely located diagnostic apparatus 11 through communication such as the Internet 9 and/or the like. Finally, the diagnostic apparatus 11 evaluates, for example, fatigue damage in the rotating component 5*b* based on the sensor signal and operation information of the rotating electrical machine. For this purpose, initially, the component strain range calculating section 12*b* calculates a strain range for a component using a quadratic function of a signal of the rotational speed sensor, the result of an elastic finite element analysis, a stress strain diagram of materials, and Neuber's rule.

Subsequently, the fatigue damage rate calculating section 12*c* calculates a fatigue damage rate in the rotating component 5*b* using a fatigue strength diagram for strain control of materials and modified Miner's rule. The integration storage section 12*d* performs a cumulative calculation of fatigue damage rates and stores a cumulated fatigue damage rate. The display control section 12*e* converts the analysis result into a user-understandable display format which is then displayed on the output unit 13 such as the monitor screen or the like. At this time, a user's instruction is also captured through the input unit 14 such as a keyboard or the like and reflected in arithmetic approach and display.

Figure 3:
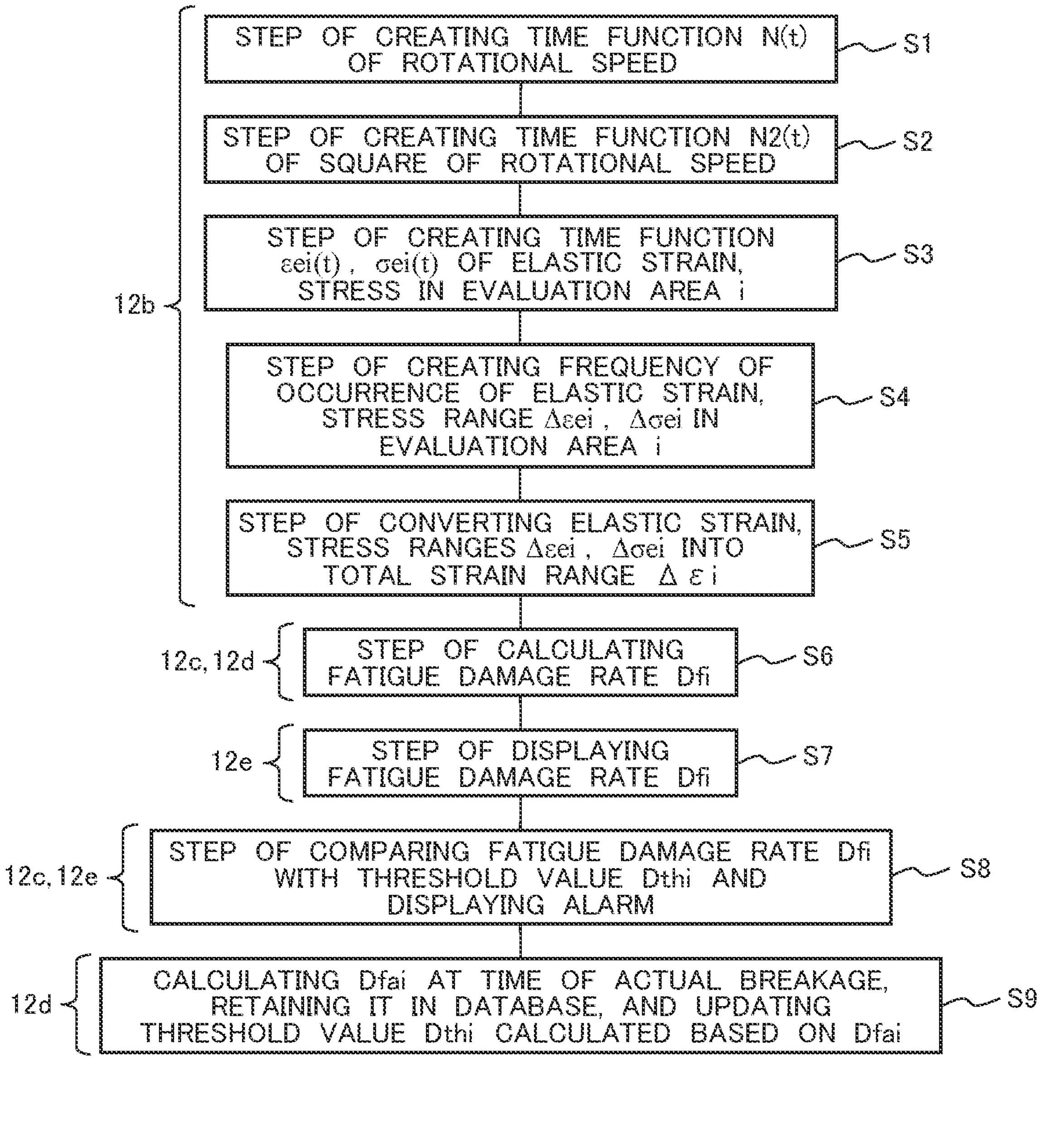
FIG. 3 is a diagram illustrating an example flow of the damage diagnosis processing in a processing unit 12.

FIG. 3 is a diagram illustrating an example flow of damage diagnosis processing in the processing unit 12. Processing step signs (S1 to S9) representing the processing in the damage diagnosis processing are indicated on the right side of the flow diagram, and arithmetic processing portions (12*a* to 12*e*) for the respective functions illustrated in FIG. 2 are indicated on the left side. According to this, for example, the component strain range calculating section 12*b* is implemented by processing steps S1 to S5. It is noted that the processing order of the processing steps in FIG. 3 is not always the same as the processing order in the arithmetic processing portions of the respective functions in FIG. 2, and in the actual processing, repetitive processing and storing processing required in each repetitive processing, display processing, correction processing, and the like are executed as appropriate.

In the series of processing, initially, as the processing in the component strain range calculating section 12*b*, in a processing step S1, a signal of the rotation speed of a rotor which is the rotating component 5*b* of the rotating electrical machine 5 is acquired at a predetermined sampling frequency, and a time function N(t) of the rotational speed is created. In a wind turbine generator 5 and/or the like, a time function N(t) is created at a sampling frequency of the order of 1 Hz, which is then retained in an internal storage device in the control monitoring unit 8. The sampling frequency is defined as a frequency at which rotational speed variations in the rotating electrical machine may be described. The above-described processing in processing step S1 is performed in an input stage in the control monitoring unit 8. Then, the rotational speed signal is transmitted to and retained in a remotely located monitoring facility or the Cloud from the control monitoring unit 8 using the communication network 9.

Figure 4:
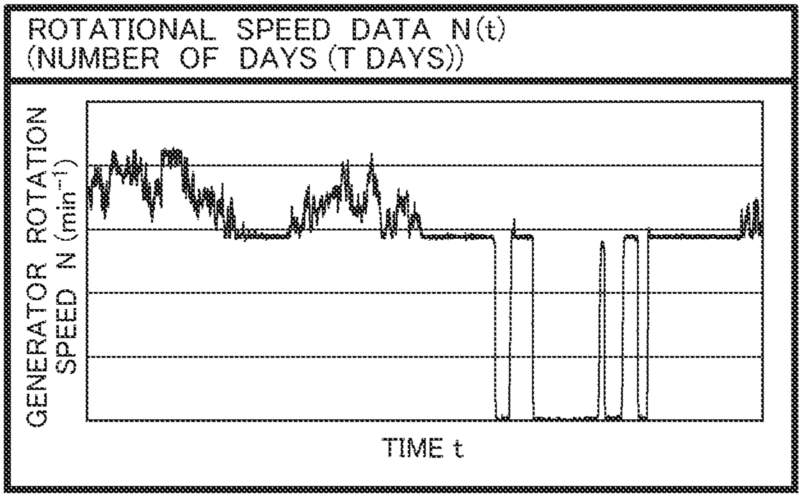
FIG. 4 is a diagram illustrating an example of a time function N(t) of a rotational speed.

FIG. 4 illustrates an example of the time function N(t) of a rotational speed. The example illustrates a collection for a time span of T days. In this example, it is assumed that in the first half of the time span of T days, the operation is conducted with rotational speeds varying but within a predetermined range, whereas in the second half, the phenomenon of momentary interruption is exhibited on occasion. In the following processing step S2, a function $N^2(t)$ of the square of the time function of the rotational speed is created and retained.

In processing step S3, a rotor elastic stress function $\sigma_{ei}(t)$ proportional to the function $N^2(t)$ of the square of the time function of the rotational speed is created and retained. The rotor elastic stress function $\sigma_{ei}(t)$ is created for each area of the rotor where damage is to be evaluated. At this time, the elastic stress function of the rotor area i may be expressed by Equation (1). It is noted that i is a suffix (=1, 2, 3, . . . ) denoting an area to be evaluated.

$$\sigma_{ei}(t)=k_{si}*\{N(t)\}^2=k_{si}*N2(t) \tag{1}$$

Processing step S3 may be a step for calculating an elastic strain εei(t) represented by Equation (2). This is because the elastic stress σei(t) and the elastic strain εei(t) are in a proportional relationship having a proportionality constant which is a longitudinal elastic modulus of materials. In this case, i is also a suffix (=1, 2, 3, . . . ) denoting a rotor area to be evaluated.

$$\varepsilon_{ei}(t)=k_{ei}*\{N(t)\}^2=k_{ei}*N2(t) \tag{2}$$

Figure 7:
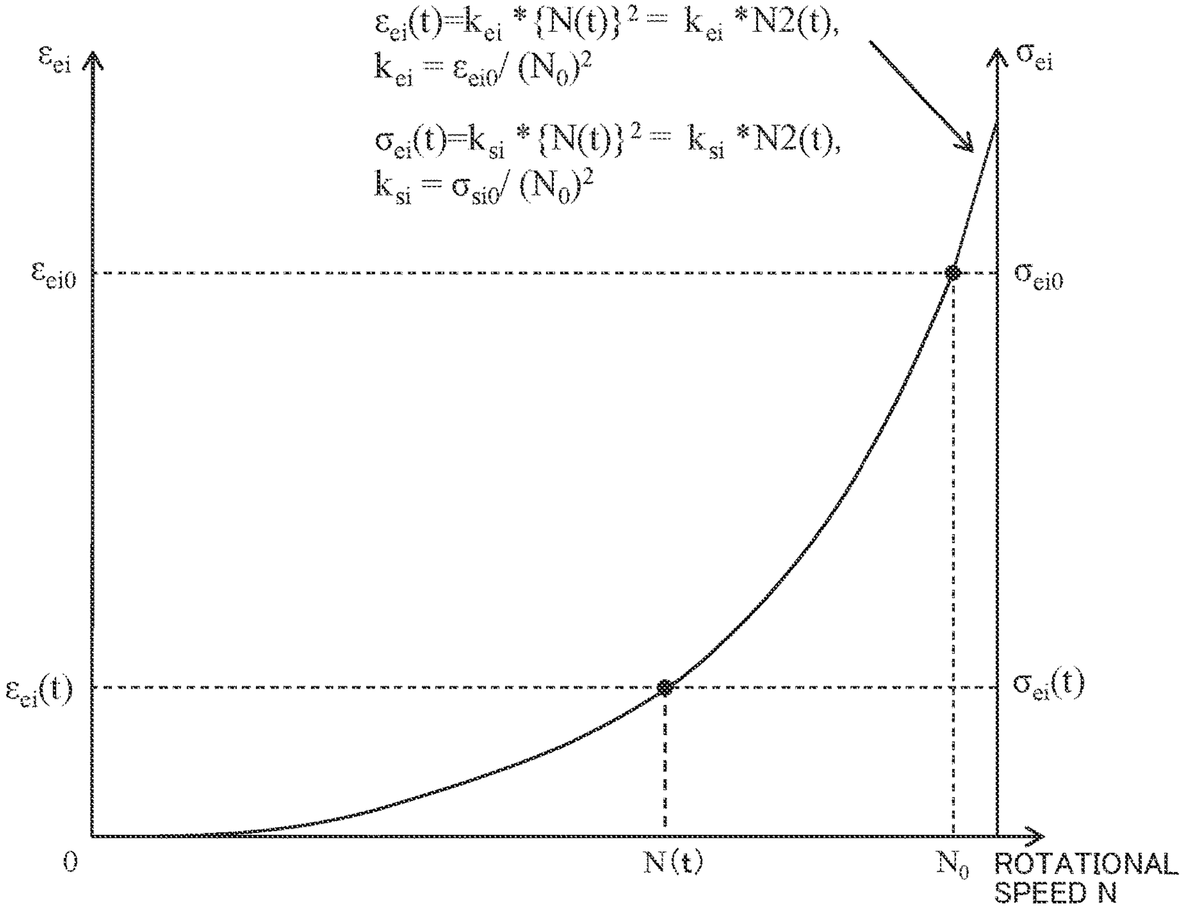
FIG. 7 is a diagram illustrating a relationship between the time function N(t) of the rotational speed, the elastic stress σei and the elastic strain εei.

In Equations (1) and (2), modulus terms $k_{si}$ and $k_{ei}$ are set as follows. FIG. 7 is a characteristic curve where the horizontal axis indicates the rotational speed N including a rated rotational speed $N_0$ and the vertical axis indicates the elastic stress σei and the elastic strain εei. The characteristics shown in FIG. 7 correspond to the quadric function shown in Equation (1), (2). With respect to the elastic stress σei0 and the elastic strain εei0 at the rated rotational speed $N_0$, measured values at N(t) at a current time are the elastic stress σei(t) and the elastic strain εei (t). For setting the modulus terms $k_{si}$ and $k_{ei}$ in Equations (1) and (2), each of the elastic stress $\sigma_{e0i}$ and the elastic strain $\varepsilon_{e0i}$ in an evaluation area i at a rotational speed $N_0$ is determined by material mechanics calculation and/or numerical calculations such as elastic finite element method and the like. Here, i is a suffix denoting an area to be evaluated. For the area i with residual stress, constant terms shown in Equations (3), (4) are incorporated in Equations (1), (2).

$$K_{si}=\sigma_{si0}/(N_0)^2 \tag{3}$$

$$K_{ei}=\varepsilon_{ei0}/(N_0)^2 \tag{4}$$

Figure 5:
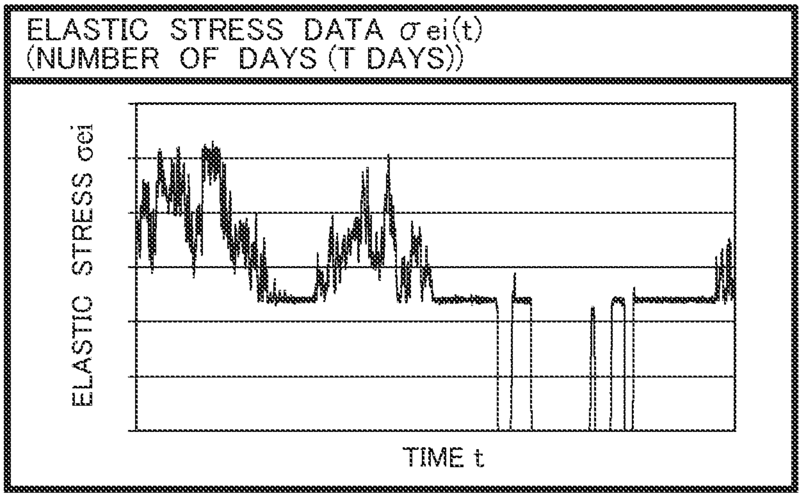
FIG. 5 is a diagram illustrating an example where a time function $\sigma_{ei}(t)$ of elastic stress of an evaluation area i is created from the time function N(t) of the rotational speed.
Figure 6:
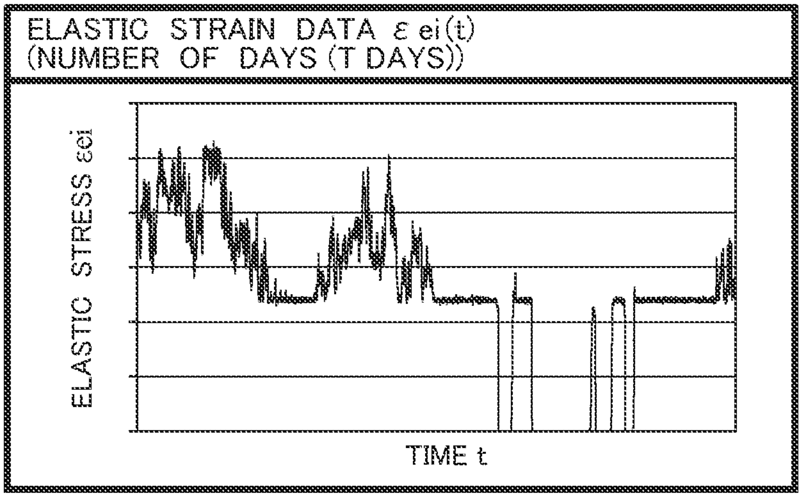
FIG. 6 is a diagram illustrating an example where a time function $\varepsilon_{ei}(t)$ of elastic strain of an evaluation area i is created from the time function N(t) of the rotational speed.

FIG. 5 illustrates an example where a time function $\sigma_{ei}(t)$ of elastic stress of an evaluation area i is created from the time function N(t) of the rotational speed in FIG. 4, Equation (1) and Equation (3). FIG. 6 illustrates an example where a time function $\varepsilon_{ei}(t)$ of elastic strain of an evaluation area i is created from the time function N(t) of the rotational speed in FIG. 4, Equation (2) and Equation (4).

FIG. 7 is a diagram illustrating a relationship between the time function N(t) of the rotational speed, the elastic stress σei and the elastic strain εei, expressed by Equation (1) to Equation (4). In FIG. 7, when the horizontal axis indicates the time function N(t) of the rotational speed and the vertical axes indicate the elastic stress σei and the elastic strain εei, the elastic stress σei and the elastic strain εei may be expressed as square-law characteristics of the time function N(t) of the rotational speed. When the rotational speed is equal to the rated rotational speed $N_0$, the values of the elastic stress σei and the elastic strain εei are σei0 and the elastic strain εei0, respectively. When the rotational speed at a current time is N(t), the values of the elastic stress σei and the elastic strain εei are σei(t) and the elastic strain εei(t), respectively. According to the square-law characteristics, the higher the rotational speed is, the greater the increments of the elastic stress σei and the elastic strain εei are reflected.

In processing step S4 in FIG. 3, the frequency of occurrence of the stress range or strain range is determined from the time function σei(t) of the elastic stress or the time function εei(t) of the elastic strain, using a frequency counting method for the stress range or the strain range, typified by the rainflow method. Then, the elastic stress range Δσei or the elastic strain range Δεei of an area where damage is evaluated and the number of occurrences thereof are calculated and retained.

Figures 8, 9:
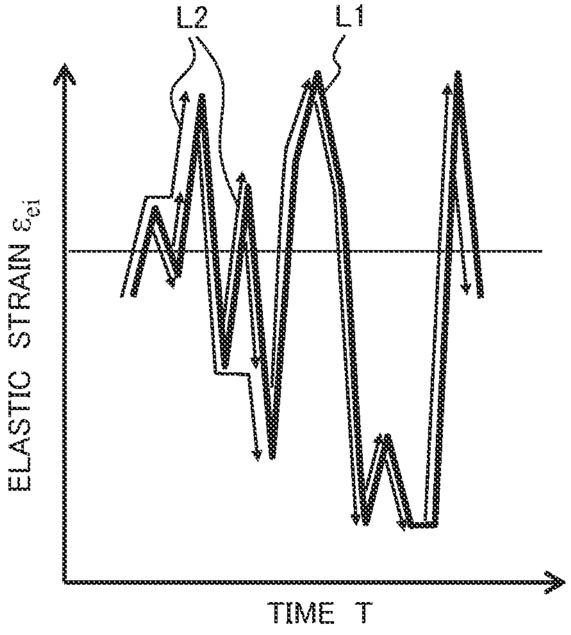
FIG. 8 is a diagram illustrating the concept of the rainflow method.
FIG. 9 is an example table illustrating a relationship between the number of times and an elastic strain range determined by the rainflow method.

FIG. 8 is a diagram illustrating the concept of the rainflow method, in which the vertical axis indicates the elastic strain εei (or elastic stress σei) and the horizontal axis indicates time that advances from left to right. The strain is negative on the lower side and positive on the upper side. Heavy zigzag line L1 shows changes in strain over time. Thin line L2 shows "raindrops" flowing based on the rainflow method. FIG. 8 shows an example where the frequency of the elastic strain range Δεei is counted by the rainflow. For frequency count, an appropriate cycle-counting method may be used such as a range pair method, a range pair mean method, and the like. At this stage, a strain maximum value $\Delta\varepsilon_p$ in a certain time range is also retained. This facilitates histogram display of the frequency distribution of the elastic strain range Δεei.

FIG. 9 illustrates an example of a relationship between the number of times and the elastic strain range determined by the rainflow method. For the elastic strain range Δεei, a maximum value $\Delta\varepsilon_p$ of strain in a certain time range is divided by a certain number of partitions m, thereby the frequency distribution becoming uniform frequency distribution with equal intervals, which in turn facilitates the analysis of distribution of the frequency number of the strain range. This is the same as when the frequency distribution of the elastic stress range Δσei is determined.

Figure 10:
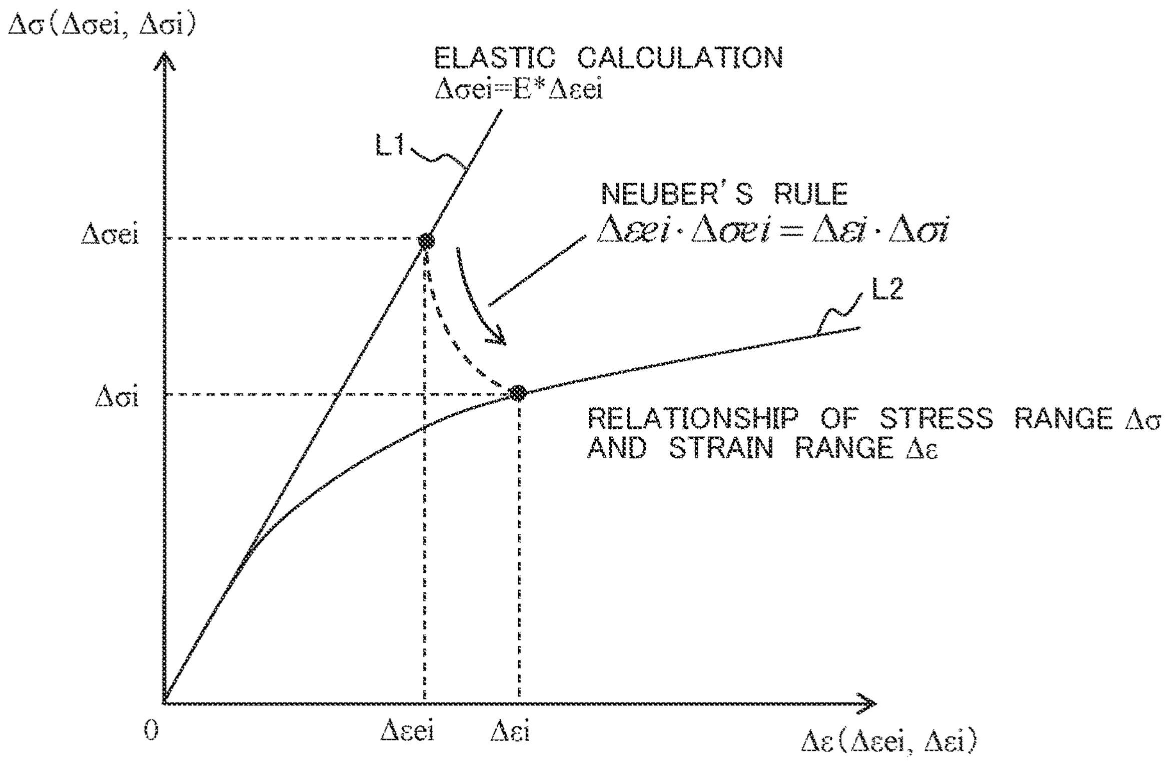
FIG. 10 is a diagram illustrating the conversion of an elastic strain range Δεei of a member i into a total strain range Δεi.

FIG. 10 is a diagram illustrating the conversion of an elastic strain range Δεei of a member i into a total strain range ΔεI, in which the horizontal axis indicates a strain range Δε and the vertical axis indicates a stress range Δσ. In FIG. 10, a straight line as elastic calculation property L1 of the member i and saturation characteristics L2 showing a relationship between the stress range Δσ and the strain range Δε are also illustrated. As shown in FIG. 10, the elastic stress range Δσei and the elastic strain range Δεei of the member i determined by elastic calculation are in a proportional relationship, which can be positioned and indicated on the elastic calculation property L1.

On the other hand, Neuber's rule can be used to reflect a point on the elastic calculation property L1 as a point on the saturation characteristics L2 showing a relationship between the stress range Δσ and the strain range Δε. For information, the point shown by the elastic stress range and the elastic strain range for the member i determined in terms of elasticity has coordinates (Δσei, Δεei), and the point on the saturation characteristics determined based on Neuber's rule shown in Equation (5) has coordinates (Δσi, Δεi). The ΔσI and Δεi denoting a coordinate of the point on the saturation characteristics L2 correspond to the total stress range Δσi and the total strain range Δεi, respectively.

$$\Delta\varepsilon_{ei}\cdot\Delta\sigma_{ei}=\Delta\varepsilon_i\cdot\Delta\sigma_i, \quad (5)$$

In processing step S5, using the relationship between the stress range Δσ and the strain range Δε of materials, the elastic stress range Δσei and the elastic strain range Δεei of the member i are converted into the total strain range Δεi, which is then retained. This is a method known as Neuber's rule. Specifically, the total strain range Δεi is determined from the relationship between the stress range Δσ and the strain range Δε and Equation (5). The relationship between the stress range Δσ and the strain range Δε varies depending on repeated stress and/or strain, and therefore the relationship may be changed according to the number of the repetitions.

Figure 11:
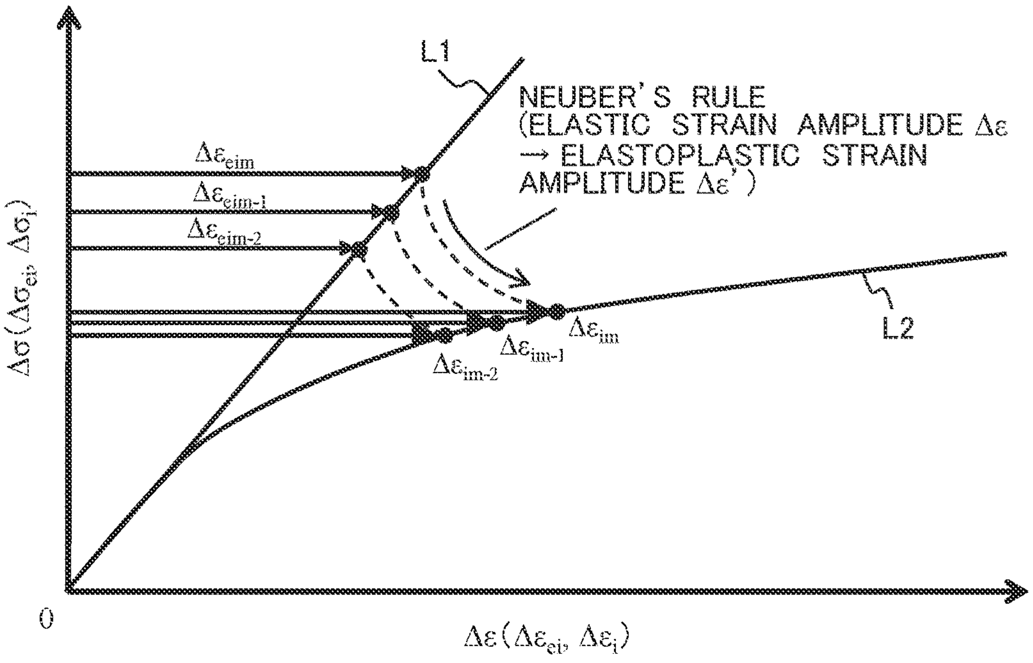
FIG. 11 is a diagram illustrating the conversion of a frequency distribution of an elastic strain range Δεei at each point (i) into a frequency distribution of a total strain range Δεi.
Figures 12, 13:
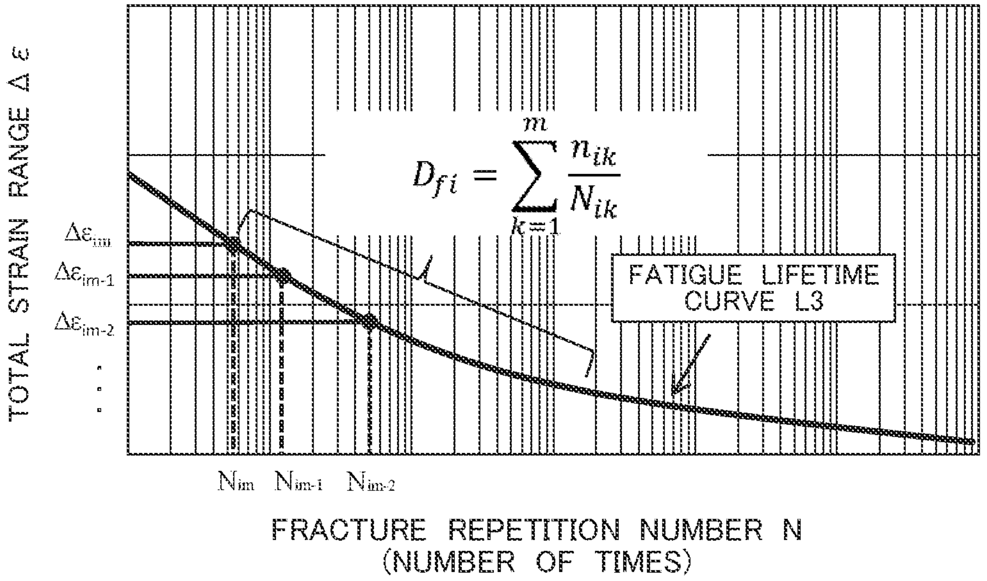
FIG. 12 is a table illustrating a relationship between a total strain range Δεi and the frequency thereof.
FIG. 13 is a diagram showing a fatigue lifetime curve L3 as the relationship between a strain range Δe and rupture lifetime (fracture repetition number N) and describing how to calculate a fatigue damage rate Dfi according to the linear damage rule in the evaluation area i.

Further, as a result of this processing, each point (Δeim) indicated in the frequency distribution of the elastic strain range Δεei in FIG. 9 may be converted into each point (Δim) indicated in the frequency distribution of the total strain range Δεi as illustrated in FIG. 11. Thus, as illustrated in FIG. 12, the relationship between the total strain range Δεi and the frequency thereof is determined. It is noted that FIG. 11 is a diagram illustrating the conversion of a frequency distribution of the elastic strain range Δεei at each point (i) into a frequency distribution of the total strain range Δεi, and FIG. 12 is a table illustrating a relationship between the total strain range Δεi and the frequency thereof.

The previous discussion describes the processing in the component strain range calculating section 12*b* in FIG. 2. Next, the processing in the fatigue damage rate calculating section 12*c* is performed in processing step S6. In processing step S6, a fatigue damage rate Dfi of the area i in question is calculated from the relationship between the total strain range Δe and the frequency (the number of times n) thereof created in processing step S5 and shown in FIG. 12 and from the fatigue test results of materials of the component under evaluation, i.e., the relationship between the total strain range Δe and rupture lifetime (fracture repetition number N) shown in FIG. 13. The fatigue damage rate Dfi may be calculated using, for example, linear damage rule typified by modified Miner's rule as shown in Equation (6) and/or various damage rules.

$$D_{fi}=\sum_{k=1}^{m}\frac{n_{ik}}{N_{ik}} \quad (6)$$

It is noted that FIG. 13 is a diagram showing a fatigue lifetime curve L3 as a relationship between the strain range Δε and rupture lifetime (fracture repetition number N) and describing how to calculate a fatigue damage rate Dfi according to the linear damage rule for the evaluation area i. The characteristics are pre-obtained as the fatigue test results of materials of the component under evaluation. By referring to the characteristics L3, and by referring to a value of the total strain range Δe summarized in FIG. 12, fracture repetition number N at the time of the value is determined, so that Equation (6) may be executed using the fracture repetition number N and the number of times n in FIG. 12.

It is noted that, although the relationship between the strain range Δe and rupture lifetime (fracture repetition number N) as illustrated in FIG. 13 has been described as being pre-obtained using the fatigue test results in strain control, this relationship may be determined taking into account the influence of reduced lifetime by tensile hold, using fatigue test results in tensile hole.

Figure 14:
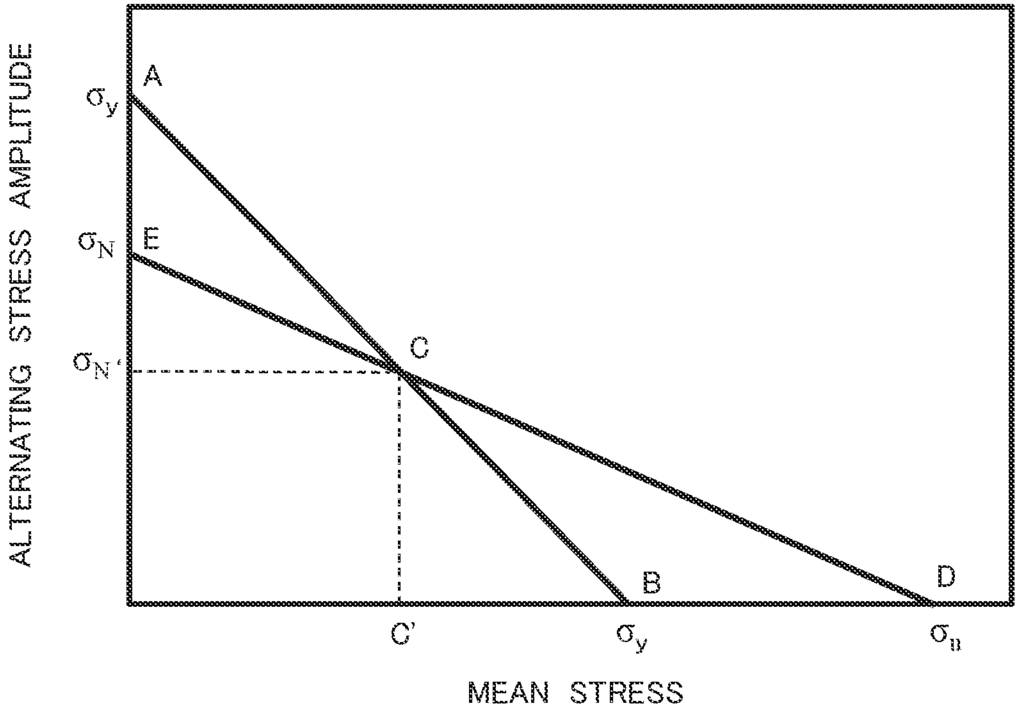
FIG. 14 is a diagram illustrating the concept of the correction based on the modified Goodman diagram.

Further, the relationship between the strain range and rupture lifetime may be used which uses the modified Goodman diagram taking into account a lifetime reduction by the effect of mean stress. FIG. 14 is a diagram illustrating the concept of the correction based on the modified Goodman diagram, in which the horizontal axis indicates mean stress and the vertical axis indicates amplitude of alternating stress. The modified Goodman diagram is used to determine: a stress amplitude σN when fracture repetition number N is reduced to one half by multiplying the strain range of fracture repetition number N by a longitudinal elastic modulus; and a stress amplitude σ'N when fracture repetition number N is reduced due to the effect of mean stress from yield stress σy, tensile strength σu of materials. Then, the stress amplitude σ'N when fracture repetition number N is reduced due to the effect of mean stress is divided by a longitudinal elastic modulus, and the resulting value is doubled to obtain a strain range ΔεN at fracture repetition number N.

Figure 15:
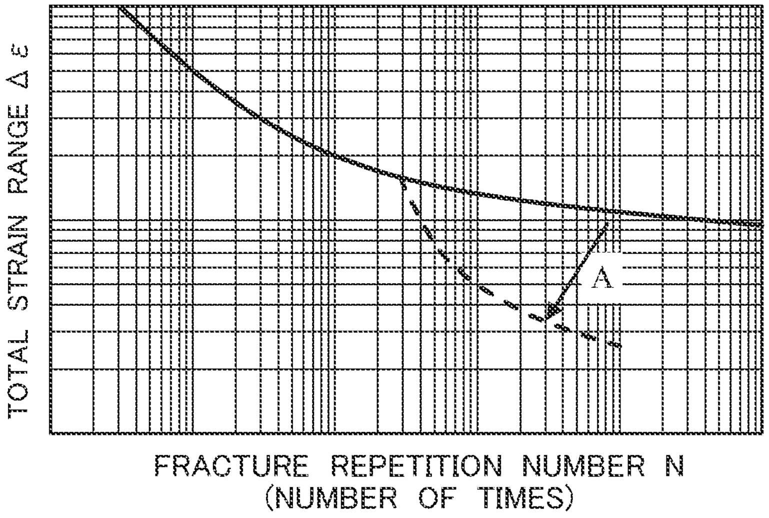
FIG. 15 is a diagram illustrating a relationship between a strain range and rupture lifetime in consideration of the effect of mean stress.

FIG. 15 illustrates a relationship between the strain range and rupture lifetime taking into account the effect of mean stress. Using the relationship between the strain range (vertical axis) and the rupture lifetime (fracture repetition number, the horizontal axis) as illustrated in FIG. 15 may enable easy consideration of the effect of mean stress. The effect of mean stress causes a reduction in lifetime by the effect of mean stress as shown by the dotted line in FIG. 15. Here, the relationships between the strain range and the fracture repetition number taking into account the effect of mean stress have been discussed. For the relationships, the relationship between the strain range and the fracture repetition number by the fatigue test results taking into account the effect of hold stress and the environmental effects such as corrosion environments and/or the like may be used.

In the processing step S6, this is also retained and cumulated as the function of the integration storage section 12*d* in FIG. 2.

In processing step S7, as the function of the display control section 12*e* in FIG. 2, the fatigue damage rates Dfi in the area i obtained in processing step S6 and the integrated value ΣDfi thereof are displayed in appropriate form.

Further, in processing step S8, as the functions of the fatigue damage rate calculating section 12*c* or the integration section 12*d* and the display control section 12*e* in FIG. 2, an alarm is displayed when the fatigue damage rate Dfi (i=1, 2, 3, . . . , i is a component number) or the integrated value thereof exceeds a preset threshold Dthi (i=1, 2, 3, . . . , i is a component number). This enables maintenance such as repair, replacement and/or the like to be performed prior to fatigue failure of the member i.

In processing step S9, also, when there is a case where the member i is actually broken, Dfai at the time when the actual breakage is caused is calculated and retained in a database, and a threshold Dthi is calculated based on the Dfai and updated.

According to Embodiment 1, damage caused from the rotation of a rotating electrical machine component is predicted with precision, so that remaining lifetime may be evaluated with precision, thus increasing the reliability of the rotating electrical machine and achieving suitable maintenance.

Embodiment 2

In Embodiment 2, desirable monitoring target sites in the rotating electrical machine 5 are descried. One of the monitoring target sites is a site or component used as a member with a rotating copper member that is a conductor, in the rotating electrical machine 5 on which centrifugal force caused by the rotation is exerted. Specifically, the monitoring target sites include a coil, a coil end, a jumper wire, a conductor bar (bar), and an end ring. For such copper components, thermally treated materials with low yield stress are used for the purpose of improving the workability. As in the example of the bar and the end ring, the yield stress may be reduced by being exposed at high temperature of the order of 800° C. due to brazing.

According to the present invention, the lifetime is evaluated when such members whose yield stress tend to be reduced are repeatedly exposed to centrifugal force caused by rotation, and repair and/or replacement may be performed before damage occurs.

Further, as the other monitoring target sites, the application to an area that is a rotational part in the rotating electrical machine and a stress concentration part is desirable. Specifically, a slot into which an iron core of the bar is inserted, a cooling hole installed in an iron core, a hole for a mounting bolt of a fan, and the like are included in such an area.

The present invention encompasses applications to a stress concentration area that experiences centrifugal force caused by rotation of a rotating machine, such as a turbine including a gas turbine, a steam turbine, a hydraulic turbine, a wind turbine, a compressor, and the like.

Embodiment 3

Figure 16:
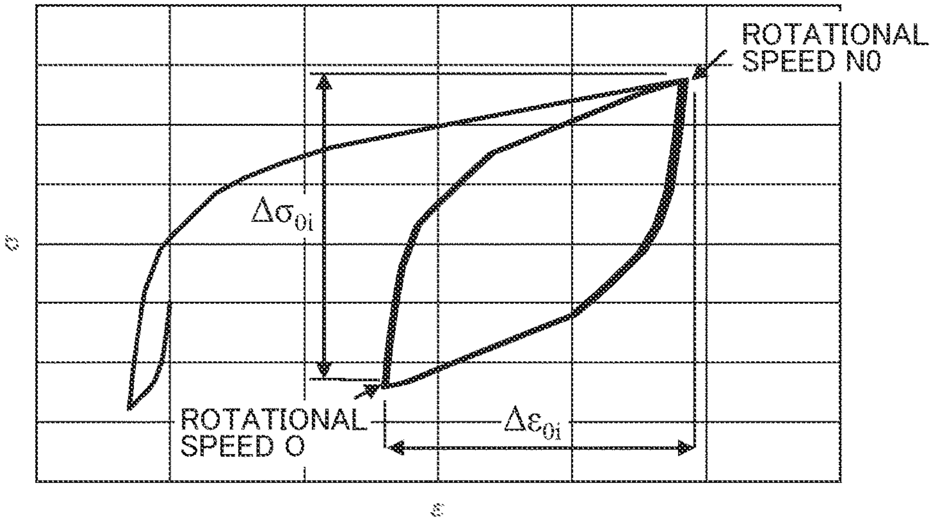
FIG. 16 is a diagram illustrating an example where a strain range and a stress range in an area i are determined by an elastoplastic finite element analysis.

FIG. 16 illustrates an example where a strain range and a stress range in an area i are obtained by an elastoplastic finite element analysis. The analysis was conducted to determine stress and strain in the area i using a rotational speed as a parameter.

It is found from FIG. 16 that when the rotational speed is increased repeatedly from zero to $N_0$, the stress range is $\Delta\sigma_{0i}$ and the strain range is $\Delta\varepsilon_{0i}$. Using the stress range $\Delta\sigma_{0i}$ and the strain range $\Delta\varepsilon_{0i}$ obtained by the elastoplastic stress analysis, the functions of the rotational speed, the elastic stress, and the elastic strain shown in Equation (1), Equation (2) may be created.

Figure 17:
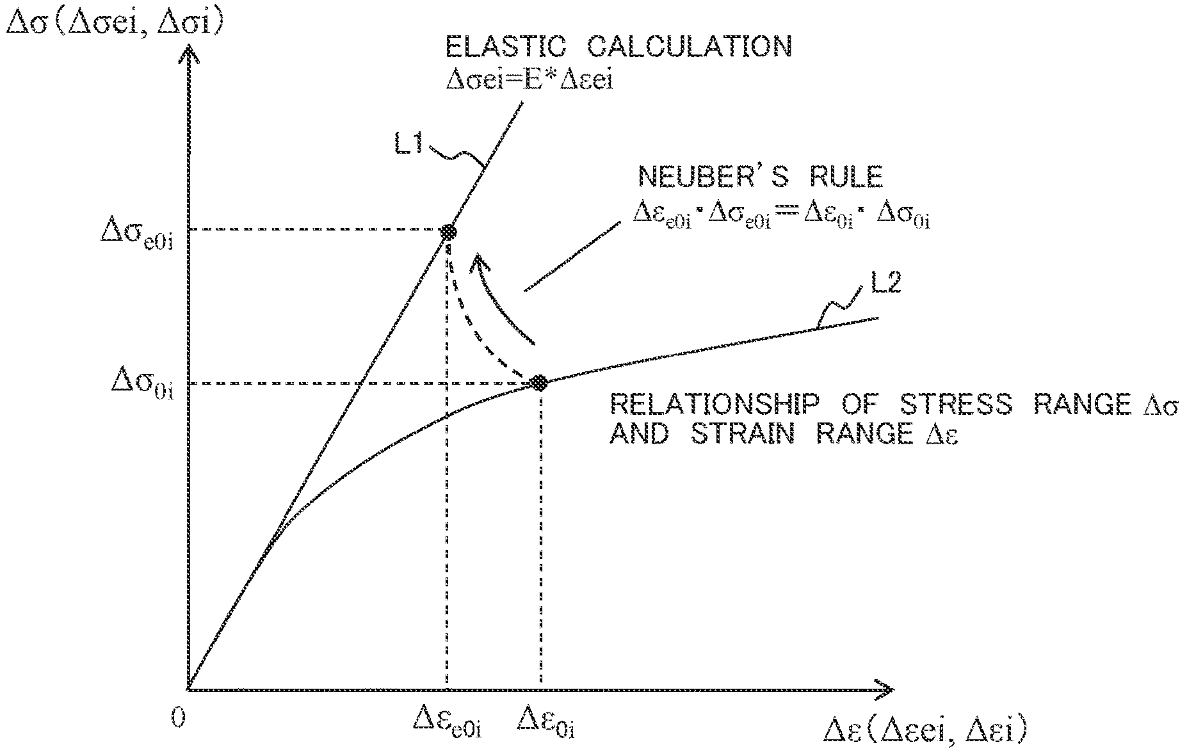
FIG. 17 is a diagram illustrating the use of Neuber's rule for conversion into an elastic stress range $\Delta\sigma_{eOi}$ and an elastic strain range $\Delta\varepsilon_{eOi}$.

This corresponds to, as shown in FIG. 17, conversion of the stress range $\Delta\sigma_{0i}$ and the strain range $\Delta\varepsilon_{0i}$ obtained in FIG. 16 into an elastic stress range $\Delta\sigma_{e0i}$ and an elastic strain range $\Delta\varepsilon_{e0i}$ by using Neuber's rule.

Moduli $k_{si}$, $k_{ei}$ may be determined using the converted elastic stress range $\Delta\sigma_{e0i}$, the converted elastic strain range $\Delta\varepsilon_{e0i}$, and Equations (3), (4). If an apparatus or area where fatigue evaluation is performed has high non-linearity, the method in FIG. 16, FIG. 17 is effective. This is because the method calculates the elastoplastic behavior of a complicated structure using a finite element method.

LIST OF REFERENCE CHARACTERS

1 . . . tower,
2 . . . nacelle,
3 . . . blade,
4 . . . speedup gear,
5 . . . generator 5,
5*a* . . . non-rotating component,
5*b* . . . rotating component,
6 . . . rotation counter,
7 . . . windfarm,
8 . . . intra-farm control monitoring unit,
9 . . . Internet,
10 . . . wind power generation apparatus,
11 . . . diagnostic apparatus,
12 . . . processing unit,
12*a* . . . signal input unit,
12*b* . . . component strain range calculating section,
12*c* . . . fatigue damage rate calculating section,
12*d* . . . integration storage section,
12*e* . . . display control section,
14 . . . input unit,
13 . . . output unit.

What is claimed is:

1. A rotating electrical machine damage diagnostic system which evaluates fatigue damage in a component of a rotating electrical machine of a wind power generation apparatus based on a sensor signal representing detection by a sensor installed in the rotating electrical machine, comprising:

a wind power generation apparatus or motor including a rotating electrical machine;

a sensor sensing rotational speed of the rotating electrical machine; and a diagnostic apparatus disposed remotely from the wind power generation apparatus, wherein the diagnostic apparatus includes:

a strain range calculating section for determining elastic strain and elastic stress in an evaluation area of the rotating electrical machine in terms of a quadratic function of a rotational speed of the rotating electrical machine detected by the sensor, determining a frequency of occurrence and an amplitude of an elastic strain range and a frequency of occurrence of an elastic stress range in the evaluation area, and using Neuber's rule to perform conversion of the elastic strain range and the elastic stress range into a total strain range;

a fatigue damage rate calculating section for calculating fatigue damage rates in the evaluation area of the rotating electrical machine from the total strain range resulting from the conversion; and an integration section for cumulating the fatigue damage rates to calculate a cumulated fatigue damage rate, wherein either the fatigue damage rate calculating section or the integration section issues an alarm when the fatigue damage rates or a cumulated value of the integration section exceeds a preset threshold value, wherein upon an actual breakage of the component of the rotating electrical machine, the preset threshold value is updated based on a time of the actual breakage of the component, and wherein the evaluation area is the component, which is a rotating copper member that is a conductor.

2. The rotating electrical machine damage diagnostic system according to claim 1, wherein the fatigue damage rate calculating section uses a fatigue strength diagram for strain control of materials in the evaluation area and modified Miner's rule to calculate the fatigue damage rates in the evaluation area of the rotating electrical machine.

3. The rotating electrical machine damage diagnostic system according to claim 1, wherein the diagnostic apparatus is connected to the wind power generation apparatus via a communications line.

4. The rotating electrical machine damage diagnostic system according to claim 1, wherein the rotating electrical machine includes a rotating component and a non-rotating component, and wherein the evaluation area is an area in the rotating component.

5. A rotating electrical machine damage diagnostic method for evaluating fatigue damage in a component of a rotating electrical machine of a wind power generation apparatus based on a sensor signal representing detection by a sensor installed in the rotating electrical machine, comprising the steps of:

determining elastic strain and elastic stress in an evaluation area of the rotating electrical machine in terms of a quadratic function of a rotational speed of the rotating electrical machine detected by the sensor;

determining a frequency of occurrence and an amplitude of an elastic strain range and a frequency of occurrence of an elastic stress range in the evaluation area;

using Neuber's rule to perform conversion of the elastic strain range and the elastic stress range into a total strain range;

calculating fatigue damage rates in the evaluation area of the rotating electrical machine from the total strain range resulting from the conversion; and cumulating the fatigue damage rates to calculate a cumulated fatigue damage rate, wherein either the fatigue damage rate calculating section or the integration section issues an alarm when the fatigue damage rates or a cumulated value of the integration section exceeds a preset threshold value, wherein upon an actual breakage of the component of the rotating electrical machine, the preset threshold value is updated based on a time of the actual breakage of the component, and wherein the evaluation area is the component, which is a rotating copper member that is a conductor.

* * * * *